Oct. 7, 1930. L. L. C. JAFFARD 1,777,973
DRIVE FOR TALKING MACHINES
Filed Sept. 14, 1929

Inventor,
Louis Laurent Charles Jaffard
By Langner, Parry, Card & Langner
Attys.

Patented Oct. 7, 1930

1,777,973

UNITED STATES PATENT OFFICE

LOUIS LAURENT CHARLES JAFFARD, OF PARIS, FRANCE

DRIVE FOR TALKING MACHINES

Application filed September 14, 1929, Serial No. 392,711, and in France September 26, 1928.

It has been proposed often and since a long time to replace the uniform rotary motion of phonograph records by an accelerated movement which gives the needle a uniform linear speed along the sound-record line. Thus if this linear speed is chosen equal to that corresponding to the inner radius of the records commonly used, it is possible to considerably increase the duration of the playing, this increase being of the order of the square of the outer radius. With moderate sized records recorded and played through the drive disclosed hereinbelow, I obtain a very great duration of play.

The manufacture and use of such records require the use of an improved driving gear which transforms the usual easily obtained uniform speed of rotation into an accelerated rotary motion. According to my invention this has been provided by controlling the turn-table shaft of a talking machine or recording device through a concave spindle rotating with a uniform speed, said spindle actuating the turn-table through its operating surface which is generated by the revolution of a curve having an equation $x^2y=$ constant round the axis of rotation of the spindle considered as the $y$ axis. The $x$ axis is of course perpendicular to the axis of rotation and the constant depends on the required data of the driving device. A suitable connection between the spindle and the turn-table shaft ensure the desired accelerated rotation whereby the linear speed of the needle along the sound path of the record to be recorded or played is caused to be substantially constant.

I have illustrated by way of example a form of execution of my invention wherein the spindle drives the turntable shaft through a suitable thread.

Figure 1:
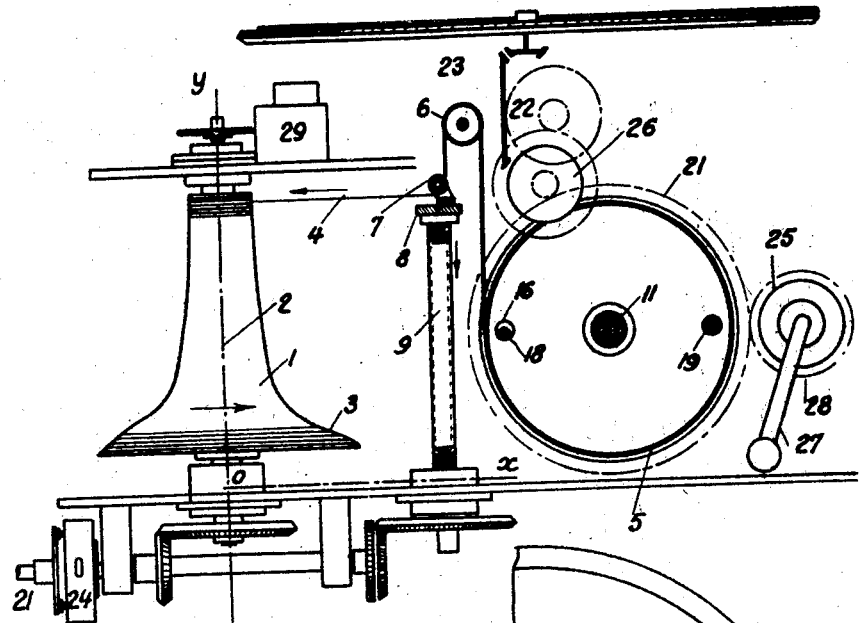
Fig. 1 is a vertical cross-section of a talking machine provided with my improved drive.
Figure 2:
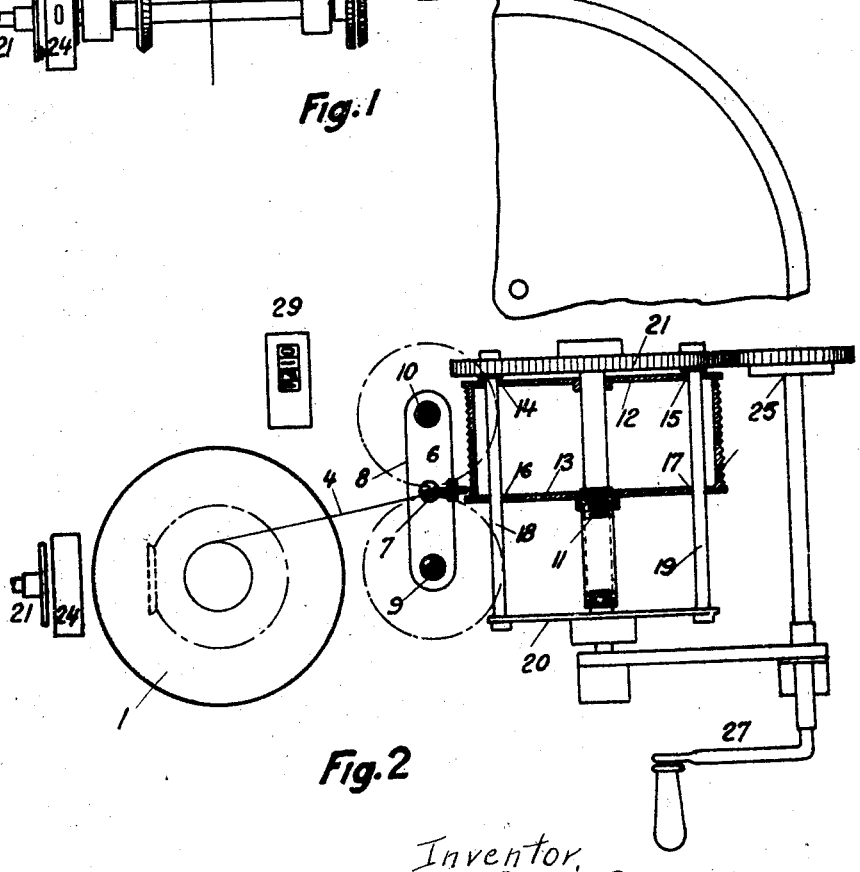
Fig. 2 is a horizontal projection thereof.

The spindle 1 having a progressively increasing radius rotates at a uniform angular speed round its axis 2. It is provided with a coiled groove 3 the turns of which are close together and have a constant pitch. In this groove is wound a driving thread or wire 4 wound off a feed drum 5. A pulley 6 moving round a stationary axis and a pulley 7 the axis of which is pivotally mounted on the plate 8 are inserted for guiding the thread between the horizontal drum and the vertical spindle and giving it the desired incline. The plate 8 is vertically moved by the vertical rotatable screws 9 and 10.

The drum 5 is provided with a helical groove having the same pitch as that on spindle 1 and is secured to the stationary horizontal screw 11 the outer thread of which has the same pitch as the spindle and drum grooves and also as the vertical screws 9 and 10. The drum 5 is provided with two end flanges 12 and 13 each provided with two circular diametrically opposed apertures 14—15 and 16—17. Through the corresponding alined apertures of the two flanges pass the rods 18 and 19 of a cage 20 adapted to move concentrically with reference to the drum 5. Of the two rods 18 and 19, one serves as a counter-weight and the other remains in contact with the walls of one of the apertures through which it passes. The driving shaft 21 rotating uniformly controls simultaneously the spindle 1 and the vertical screws 9 and 10 controlling the pulley-bearing plate 8. The part of the thread connecting the drum and spindle remains thus always substantially perpendicular to the axis of the spindle i. e. horizontal; when the drum 5 rotates it moves along its stationary horizontal screw 11 by an amount proportional to the unwinding of the controlling thread from the outer groove coils of the said drum. The result is that the two longitudinal movements of the thread compensate each other exactly; the part of the thread which is being wound off the drum remains constantly in the same vertical plane substantially perpendicular to the axis of the drum. Thus the portions of the thread near the winding and the unwinding points cannot be moved out of their groove. The drum 5 is submitted to two different movements, to wit: a movement of translation and an accelerated rotary motion, the acceleration being determined by the shape given to the spindle. The first movement provides a negligible friction between the driving rod of the cage 20 against the wall of the aperture through which it passes and inside which it slides. Furthermore the rotary motion transmitted to the cage 20 is again transmitted through the toothed wheel 21 and the gearwork 22 to the turntable shaft and thereby to the record or record blank. The free wheels 24, 25, 26 inserted as shown allow the controlling thread to be wound off the spindle on to the drum through the agency of the pinion 28 and crank 27, the turn-table and motor remaining inoperative owing to the corresponding free wheels 26, 24 whereas the crank remains stationary during playing owing to the interposition of its free wheel 25. A meter 29 gives out the number of revolutions made at any moment whereby the exact location of the thread with reference to the spindle may be ascertained.

This allows any desired portion of the record to be played provided the number of revolutions required for reaching the beginning of the said portion has been previously ascertained.

It is easy to see that the surface generated by the curve $x^2y=$ constant, corresponding to the bottom of the guiding grooves of the spindle is really the one giving to the disc a constant linear speed under the needle.

The form of the sound path of the disc is a spiral of Archimedes whose equation is:

(1) $\quad r=Ka$ $r$ being the radius vector, $a$ the polar angle and $K$ a constant.

The constant linear speed of the disc under the needle being termed V, we have (2) $\quad V=r\dfrac{da}{dt}$ or, taking Equation (1) into account:

(3) $\quad V=Ka\dfrac{da}{dt}$ with a convenient choice of the margin of time, we conclude from this last equation:

$$a^2=2\dfrac{V}{K}t$$

or:

$$a=\sqrt{2\dfrac{V}{K}t}$$

finally:

(4) $\quad da=\sqrt{\dfrac{V}{2K}}\dfrac{dt}{\sqrt{t}}$

The length $dl$ of the thread which during $dt$ is unfolded from the drum 5 is proportional to $a$, so we may write $$dl=Bda$$

or, taking into account the Equation (4), (5) $\quad dl=E\dfrac{dt}{\sqrt{t}}$

B and E being constants.

But on the other hand, $dl$ is equal to the corresponding arc $ds$ of the guiding groove of the spindle; said arc is itself substantially equal to the corresponding arc of the projection C of said groove on a plan perpendicular to the spindle axis; let us term A and R the radius vector and polar angle of a point of said curve C, we have:

$$ds=dA\sqrt{R^2+\left(\dfrac{dR}{dA}\right)^2}$$

but $\dfrac{dR}{dA}$ is in practice very small and so we may neglect it and write:

(6) $\quad ds=RdA$ and since $ds$ is always equal to $dl$, by combination of (5) and (6), we obtain:

(7) $\quad E\dfrac{dt}{\sqrt{t}}=RdA$

But the angular speed of the spindle remaining constant, we have $dA=Fdt$ or:

(8) $\quad t=\dfrac{A-A'}{F}$ $A'$ and F being constant; and then, by elimination of $t$ between (7) and (8), we obtain:

(9) $\quad R(A-A')^2=$ constant for equation of the curve C.

Now, since the vertical displacement of the thread at its arrival on the spindle is proportional to the angular displacement of said spindle, if we call $x$ and $y$ the coordinates of a point of the curve generating the spindle, we have, with a convenient choice of the origin:

$$\begin{cases} A-A'=y \\ R=x \end{cases}$$

and thus the equation of said generating curve is really:

$$xy^2=\text{constant}$$

The control of the spindle may be effected by any spring or an electric motor actuating the spindle shaft and imparting thereto a uniform rotary motion. Other mechanical devices beyond that disclosed may obviously be used for driving the turn-table shaft from the spindle. For instance one or more coils of the driving thread may be wound over a drum and drive it frictionally. The drum drives the turn-table shaft as precedently through a suitable gearwork.

The thread passing over the drum is unwound from a second spindle similar to the first one and rotating at the same uniform speed the axes of the two spindles being parallel. The thread may thus be alternatively wound off one spindle on to the other.

What I claim is:

1. A driving device for talking and sound recording machines comprising a rotary spindle of progressively increasing radius the surface of which is generated by the revolution round its axis of rotation of a curve defined by the equation $X^2Y=$ constant, the axes of Y and of X being respectively the axis of rotation and a line perpendicular thereto, means for imparting a uniform rotary motion to the spindle, a turn-table shaft and means whereby the turn-table shaft is rotated successively by the rotation of the successive cross-sections of the spindle surface.

2. A driving device for talking and sound recording machines comprising a rotary spindle of progressively increasing radius the surface of which is generated by the revolution round its axis of rotation of a curve defined by the equation $X^2Y=$ constant, the axes of Y and X being respectively the axis of rotation and a line perpendicular thereto, means for imparting a uniform rotary motion to the spindle, a turn-table shaft, cylindrical means for controlling the said shaft and thread like means adapted to be coiled round the rotating spindle and to be coiled off the cylindrical means.

3. A driving device for talking and sound recording machines comprising a rotary spindle of progressively increasing radius provided with a substantially spirally wound groove the bottom of which lies on a surface generated by the revolution round its axis of rotation of a curve defined by the equation $X^2Y=$ constant, the axes of Y and X being respectively the axis of rotation and a line perpendicular thereto, means for imparting a uniform rotary motion to the spindle, a turn-table shaft, threadlike means adapted to be wound into the spindle groove and to control the turn-table shaft.

4. A driving device for talking and sound recording machines comprising a rotary spindle of progressively increasing radius provided with a substantially spirally wound groove the bottom of which lies on a surface generated by the revolution round its axis of rotation of a curve defined by the equation $X^2Y=$ constant, the axes of Y and X being respectively the axis of rotation and a line perpendicular thereto, means for imparting a uniform rotary motion to the spindle, a turn-table shaft, a cylindrical spirally grooved drum controlling the said shaft and threadlike means adapted to be wound off the drum groove into the spindle groove for controlling the turn-table shaft.

5. A driving device for talking and sound recording machines comprising a rotary spindle of progressively increasing radius provided with an outer substantially spirally wound groove the bottom of which lies on the surface generated by the revolution round the spindle axis of the curve $X^2Y=$ constant, the axes of Y and X being respectively said axis of rotation and a line perpendicular thereto, means for imparting a uniform rotary motion to the spindle, a cylindrical spirally grooved drum the axis of which is perpendicular to the spindle axis, threadlike means adapted to be wound off the drum groove into the spindle groove for controlling the turntable shaft and means whereby said means are caused to engage tangentially the spindle and the drum always in planes substantially perpendicular to the axes of the spindle and drum respectively.

6. A driving device for talking and sound recording machines comprising a rotary spindle of progressively increasing radius provided with an outer substantially spirally wound groove the bottom of which lies on the surface generated by the revolution round the spindle axis of the curve $X^2Y=$ constant, the axes of Y and X being respectively said axis of rotation and a line perpendicular thereto, means for imparting a uniform rotary motion to the spindle, a cylindrical spirally grooved drum the axis of which is perpendicular to the spindle axis, threadlike means adapted to be wound off the drum groove into the spindle groove for controlling the turn-table shaft, means whereby said means are caused to engage the spindle always in a plane tangent to the groove thereon and means whereby the drum is caused to advance spirally as the threadlike means are unwound from it whereby the unwinding point thereof remains stationary in space.

7. A driving device for talking and sound recording machines comprising a rotary spindle of progressively increasing radius provided with an outer substantially spirally wound groove the bottom of which lies on the surface generated by the revolution round the spindle axis of the curve $X^2Y=$ constant, the axes of Y and X being respectively said axis of rotation and a line perpendicular thereto, means for imparting a uniform rotary motion to the spindle, a cylindrical spirally grooved drum the axis of which is perpendicular to the spindle axis, threadlike means adapted to be wound off the drum groove into the spindle groove for controlling the turn-table shaft, means whereby said means are caused to engage the spindle always in a plane tangent to the groove thereon and means whereby the drum is caused to advance spirally as the threadlike means are unwound from it whereby the unwinding point thereof remains stationary in space, a rotary part adapted to rotate with the drum without advancing longitudinally with it and control means for returning said part and thereby the drum to its original position.

8. A driving device for talking and sound recording machines comprising a rotary spindle of progressively increasing radius provided with an outer substantially spirally wound groove the bottom of which lies on the surface generated by the revolution round the spindle axis of the curve $X^2Y=$ constant, the axes of Y and X being respectively said axis of rotation and a line perpendicular thereto, means for imparting a uniform rotary motion to the spindle, a cylindrical spirally grooved drum the axis of which is perpendicular to the spindle axis, threadlike means adapted to be wound off the drum groove into the spindle groove for controlling the turn-table shaft, a pulley for said threadlike means, a support on which said pulley is pivotally secured, means controlled by the spindle driving means adapted to make said pulley advance as the threadlike means are being wound on to the spindle for causing them to engage said spindle always in a plane tangent to the groove thereon, means controlled by the spindle driving means and adapted to advance the drum spirally as the threadlike means are unwound from it whereby the unwinding point thereof remains stationary in space.

In testimony whereof I have signed my name to this specification.

LOUIS LAURENT CHARLES JAFFARD.